United States Patent [19]
Jaccard et al.

[11] 3,926,917
[45] Dec. 16, 1975

[54] PROCESS FOR PERFORMING REACTIONS INVOLVING THE FORMATION OF A SOLID PHASE FROM LIQUID PHASE

[75] Inventors: Roland Jaccard; Paul Hostettler, both of Basel; Rudolf Siegrist, Hofstetten, SO, all of Switzerland

[73] Assignee: Ciba-Geigy AG, Basel, Switzerland

[22] Filed: Dec. 11, 1973

[21] Appl. No.: 423,795

Related U.S. Application Data
[62] Division of Ser. No. 155,481, June 22, 1971, Pat. No. 3,819,332.

[30] Foreign Application Priority Data
June 26, 1970 Switzerland............................ 9707/70

[52] U.S. Cl.......... 260/67.6 R; 260/69 R; 260/70 R; 260/95 C
[51] Int. Cl.²................. C08G 12/32; C08G 12/36
[58] Field of Search............ 260/67.6 R, 69 R, 70 R, 260/95 C

[56] References Cited
UNITED STATES PATENTS

| | | | |
|---|---|---|---|
| 1,258,988 | 3/1918 | Coster et al. ..................... | 159/11 A |
| 1,901,373 | 3/1933 | Lionne.............................. | 260/69 R |
| 2,418,797 | 4/1947 | Voorhees.......................... | 260/95 C |
| 2,592,809 | 4/1952 | Kralovec et al................... | 260/69 R |
| 2,916,371 | 12/1959 | O'Donnell........................ | 260/70 R |
| 3,428,607 | 2/1969 | Renner............................. | 260/67.6 R |
| 3,819,332 | 6/1974 | Jaccard et al..................... | 260/69 R |

FOREIGN PATENTS OR APPLICATIONS
223,759   11/1968   U.S.S.R.

Primary Examiner—Howard E. Schain
Assistant Examiner—W. C. Danison, Jr.
Attorney, Agent, or Firm—Wenderoth, Lind & Ponack

[57] ABSTRACT

A process for the manufacture of polymerization and polycondensation products by a liquid-to-solid phase transformation includes the steps of admitting and depositing the liquid phase on an internal surface of a drum rotating about a substantially horizontal axis, controlling the liquid phase supply and the rotational speed of the drum as a function of the velocity of the phase transformation so as to maintain a sump of the liquid phase in the drum, peeling the layer of solid phase that forms on the surface of the drum and is drawn continuously out of the sump at a point above the sump, and leading the detached layer of solid phase out of the drum through a central opening in one of the end walls of the drum.

4 Claims, 3 Drawing Figures

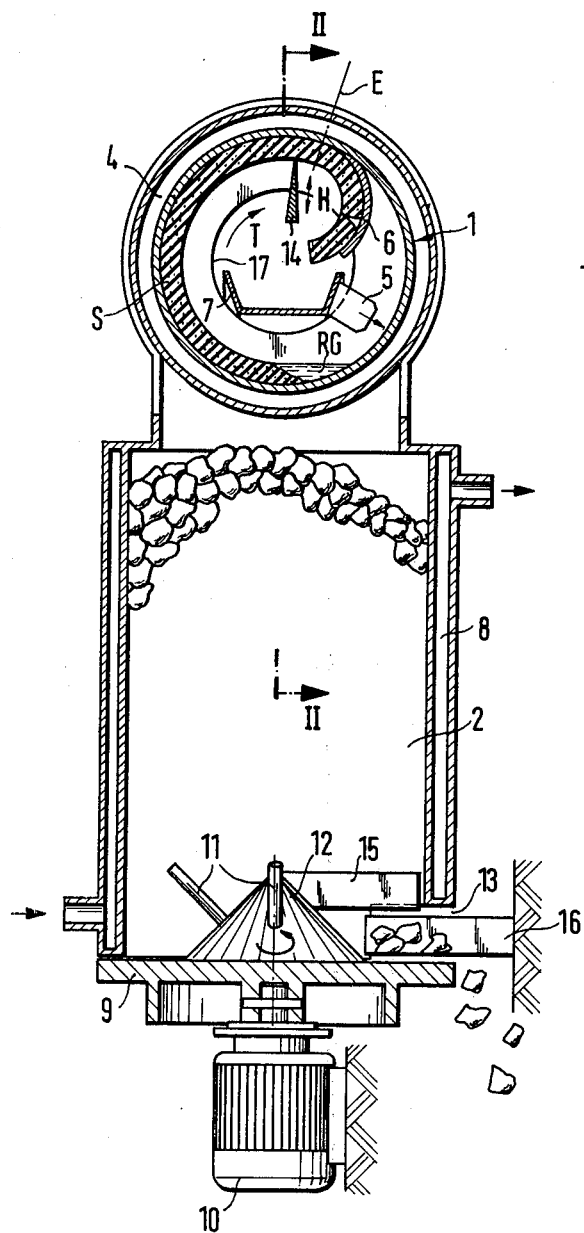
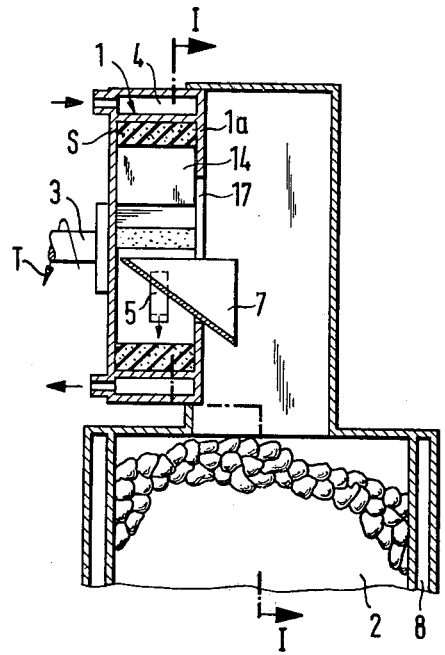
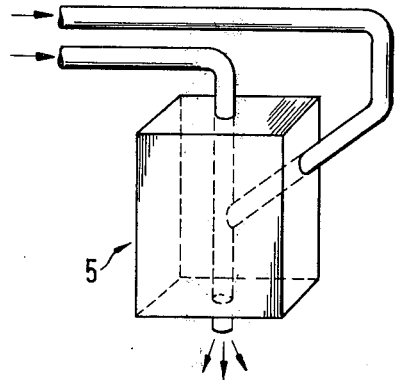
Fig.1
Fig.2
Fig.3

PROCESS FOR PERFORMING REACTIONS INVOLVING THE FORMATION OF A SOLID PHASE FROM LIQUID PHASE

This is a division of applicants' copending application Ser. No. 155,481, filed June 22, 1971, now U.S. Pat. No. 3,819,332.

BACKGROUND OF THE INVENTION

This invention relates to process for performing reactions involving the formation of a solid phase from a liquid phase. Such reactions will hereinafter be referred to as "liquid-to-solid phase tranformation reactions".

A reactor which has been proposed for the performance of catalytic polymerisation reactions comprises a fixed vertical drum which is lined with a catalyst layer, and in which a scraper blade rotates in contact with the internal surface. In this reactor, the product is subjected during the polymerisation process (phase transformation) to mechanical stresses by the rotating scraper blade. In some production processes, such as crystallisation or precipitation, and particularly in processes for the production of highly disperse cross-linked condensation polymers, these stresses have a most undesirable effect on the quality of the end product. The applicability of this reactor is therefore limited, and it also has other shortcomings. For instance, owing to its vertical disposition, the drum must always be completely filled with the liquid phase if the entire surface of the catalyst is to be utilised. The discharge of the solid phase is effected by a screw feeder through a central opening in the drum bottom, and consequently continuous operation is at least very difficult, since the major part of the liquid phase would escape through the opening in the bottom. Even in a batchwise process (discharge opening closed during the phase transformation) a complete separation of liquid and solid phases is not readily possible.

In a different previously proposed process, an admission for the liquid phase and a scraping or peeling blade cooperate with the external surface of a drum, the admission pointing roughly at the highest part and the scraping or peeling blade cooperating roughly with the lowest point of the rotating drum. Compared with the previously described system this arrangement has the advantage that the phase transformation reaction can proceed unaffected by mechanical stresses. However, it still has the major defect that its applicability is limited to liquid phases that are either highly viscous or that, upon making contact with the drum, rapidly assume a mechanically stable condition. Otherwise the phase would trickle or drip off the drum. SUMMARY OF THE INVENTION According to the present invention there is employed a system for performing a liquid-to-solid phase transformation reaction, wherein a drum is arranged for rotation about a substantially horizontal axis, the drum being formed with a central opening in one end wall thereof. A liquid is admitted and deposited on an internal surface of the drum. A stationary element is arranged above the liquid admission and deposition means for cooperating with the internal surface of the drum to continuously detach a layer of solid phase that has formed on the surface. The detached solid phase is intercepted and led through the central opening in the end wall of the drum and out of the drum.

The stationary element for cooperating with the surface of the drum is preferably in the form of a scraping blade extending in the axial direction of the drum.

The present process is suitable for the performance of substantially any type of liquid-to-solid phase transformation reaction, the only limitation naturally being that the solid phase, viz. the reaction product, must have sufficient adhesion to the internal drum wall to permit the solid phase to be carried round by the drum to the stationary scraper element. For instance, polycondensation reactions, polymerisation reactions, precipitation reactions, or crystallisations may be performed by the present process, examples of such reactions being vinyl polymerisation reactions in which liquid monomers, possibly after catalytic initiation or the application of heat, are converted to solid polymers or copolymers, or precipitation reactions in which highly disperse silica is obtained from sodium silicate and an acid solution or aluminium silicate is produced from sodium silicate and aluminium sulphate.

The present process is particularly suitable for continuously carrying out the method of producing highly disperse cross-linked condensation polymers based on urea and/or melamine and formaldehyde, described, for instance, in Belgian Patent Specification No. 730,186, the method substantially consisting in converting an aqueous solution of a precondensate of urea and formaldehyde into a cross-linked gel in the presence of a protective colloid by the addition to the solution of sulphamic acid or of a water-soluble ammonium hydrogen sulphate of the formula $[R-NH_3]^+ [SO_4H]^-$, where R is a hydrogen atom or an organic radical that does not adversely affect the water solubility, such as an alkyl, cycloalkyl, hydroxyalkyl, aralkyl or aryl radical, under conditions such that the proportion of formaldehyde to urea exceeds 1 not later than at the instant of gel formation, the resultant gel being disintegrated, dried and disagglomerated.

An advantage of the present process is, as already mentioned, that the reaction product, particularly a gel, is not or is only very slightly subjected to mechanical forces or stresses during and immediately after solidification. For many products, for instance for the production of the above-mentioned condensation polymers, this is an essential condition for ensuring a first quality product.

BRIEF DESCRIPTION OF THE DRAWINGS

In order to enable the invention to be more readily understood, reference will now be made to the accompanying drawings, which illustrate diagrammatically and by way of example an embodiment thereof, and in which:-

FIG. 1 is a sectional view of apparatus for performing a liquid-to-solid phase transformation reaction, FIG. 2 is a section taken on the line II — II in FIG. 1, and FIG. 3 is a perspective view of a detail of FIGS. 1 and 2.

DETAILED DESCRIPTION OF THE INVENTION

Referring now to the drawings, there is shown apparatus for performing a liquid-to-solid phase transformation reaction, the apparatus comprising a tower reactor having an upper part in which is located a rotatable drum 1 and a lower part 2.

The drum is fixedly mounted on a shaft 3 which is or can be coupled to drive means not shown in the drawings so that rotation of the shaft causes rotation of the drum. The drum 1 has a jacketed peripheral wall 4 for a heating fluid or a coolant. The drum could also be constructed without a jacket in which case it could be arranged to rotate inside a stationary chamber for a heating fluid or coolant. An admission for a liquid, in the form of a two-component mixing nozzle 5, terminates inside the drum 1. In FIGS. 1 and 2 this mixing nozzle is only symbolically indicated, its construction being shown in FIG. 3. The mixing nozzle 5 points towards that quarter of the circumference of the drum which in the direction of rotation of the drum indicated by an arrow T (in FIG. 1) directly precedes the lowest point of the drum interior. The drum 1 contains an element in the form of an axially extending scraping or peeling blade 6 for detaching a layer that forms on the inside surface of the drum. The blade is so disposed that its edge or point of engagement E is roughly in the middle of that quarter of the drum circumference which in the direction of rotation T of the drum follows the culminating point of the drum. The scraping or peeling blade 6 is preferably bent in the direction of curvature of the drum, as shown in FIG. 1. Below the scraping blade 6 is a discharging and conveying device in the form of a chute 7 which projects through an opening 17 cut into one end wall 1a of the drum so that the solid material removed by the blade from the inside surface of the drum can slide down the chute into the lower part 2 of the reactor. Preceding the scraping blade 6 is an axially disposed parting blade 14 which is coupled to a conventional pneumatic or electromagnetic reciprocator not shown in the drawings, and which is reciprocable in the direction of the double-headed arrow II (in FIG. 1). The frequency of reciprocation of the parting blade 14 is of the order of only a few oscillations per minute and is preferably adjustable. This parting blade is activated in the case of tough products which it cuts into sections, thus ensuring that the material detached from the surface by the following scraping blade 6 will break into pieces not exceeding a given size. The line of engagement of the parting blade 14 is preferably between that of the scraping blade 6 and the highest point of the drum periphery.

If the length of the drum 1 is up to about 300 mm., it is necessary only to provide a single nozzle 5 located roughly at the midpoint of the length of the drum. If the length of the drum exceeds about 300 mm., it is preferred to provide several nozzles equidistantly disposed along this length.

The lower part 2 of the reactor which may form an after-reaction zone is provided with a jacket 8 for a heating medium or a coolant. The floor of the bottom part of the reactor has the form of a rotary table 9, which is coupled to a motor 10 and provided with an elevated cone 12 and size-reducing and discharging elements 11 and 15. When the motor runs, these elements continuously discharge the lower part of the reactor through an outlet opening 13, discharge being effected by a plough 16 which extends into the opening 13.

In the operation of the apparatus just described, a reaction mixture is continuously sprayed through the mixing nozzle 5 onto the inside surface of the drum 1. Owing to the rotation of the drum and the solidification of the liquid reaction mixture RG, a layer S of constant thickness is formed. This layer is detached from the inside of the drum by the scraping blade 6 and slides down the chute 7 into the bottom part 2 of the reactor which functions as a ripening tower, and which is heated by means of its heating jacket 8. The rotating floor 9 and cone 12 which are driven by the motor 10 continuously discharge the gel from the ripening tower by means of the discharge elements 11 and 15.

The invention will now be further illustrated by the following Examples of the use of the apparatus shown in the drawings in which the drum diameter was 500 mm. and the length of the drum was 150 mm..

EXAMPLE 1

A highly disperse condensation polymer of urea and formaldehyde having a surface of 30 sq.m./g. and a bulk density of 40 g./litre was prepared by continuously mixing in the nozzle 5 a urea-formaldehyde precondensate with a solution of sulphamic acid in the proportion by weight of 2.93 : 1 and spraying the mixture onto the inside surface of the drum 1 heated to a temperature of 65°C.. The speed of rotation of the drum was so adjusted that the residence time inside the drum of the reaction mixture and of the solids formed from the mixture was about 1.5 minutes. The residence time of the gel in the lower part 2 of the reactor which acted as a ripening tower 2 was fixed at about 2 hours at a temperature of about 65°C.. The resultant gel was then disintegrated, neutralised, filtered and pulverised in a pin mill.

EXAMPLE 2

In the mixing nozzle 5 a cold 30% sulphuric acid and a solution of waterglass (sodium silicate) were mixed in the proportion of 1 : 4 and sprayed onto the inside wall of the drum 1 which was kept at a temperature of about 120°C., for instance with superheated steam, and which was rotated to provide a residence time of about 4 minutes for the product. A layer roughly 3 cm. thick of solid silica gel was formed and at the end of the residence time of about 4 minutes this was discharged and after-treated in the ripening tower 2 for about 3 hours at 80°C. The sodium sulphate that formed in the reaction was washed out with water and dried at 120°C., dehydrated at 350°C. and size-reduced to a grain size between 2 and 5 mm. in a hammer mill. The resultant silica gel was very suitable for use as a catalyst base.

The Purification of Aluminium Sulphate

A 50% solution of aluminium sulphate in water at 95°C. was sprayed into the drum 1 by the nozzle 5, the internal temperature of the drum being maintained between 5° and 10°C. by recirculated ice water. The speed of rotation of the drum was adjusted to provide a residence time of about 1.5 minutes. A crystal cake which was stable, though still containing the mother liquor, was formed and discharged from the drum, the cake being thereafter separated from the mother liquor by centrifuging and dried in a current of hot air. A well crystallized material was thus obtained.

We claim:

1. A process for the manufacture of a condensation polymer based on urea and/or melamine and formaldehyde, comprising the steps of mixing an aqueous solution of a precondensate of urea and/or melamine and formaldehyde in the presence of a protective colloid with a solution of sulphamic acid or a water-soluble ammonium hydrogen sulphate of the formula: $[R-NH_3]^{(+)} \cdot [SO_4H]^{(-)}$ wherein R is a hydrogen atom or an organic radical that does not adversely affect the water solubility, admitting and depositing this mixture still in a liquid state on an internal surface of a drum rotating about a substantially horizontal axis, controlling the mixture supply and the rotational speed of the drum as a function of the velocity of polymerization so as to maintain a sump of liquid mixture in the drum, peeling the layer of polymer that forms on the surface of the drum and is drawn continuously out of the sump at a point above the sump, and leading the detached layer of polymer out of the drum through a central opening in one of the end walls of the drum.

2. The process of claim 1, wherein the layer of solid polymer is peeled in that quarter of the internal periphery of the drum which, in the intended direction of rotation of the drum, follows the highest point thereof.

3. The process of claim 2, wherein the layer is peeled in the middle of said quarter.

4. The process of claim 2, wherein the layer of solid polymer is divided into sections of substantially equal length before it is peeled from the surface of the drum.

* * * * *